Figure 1:
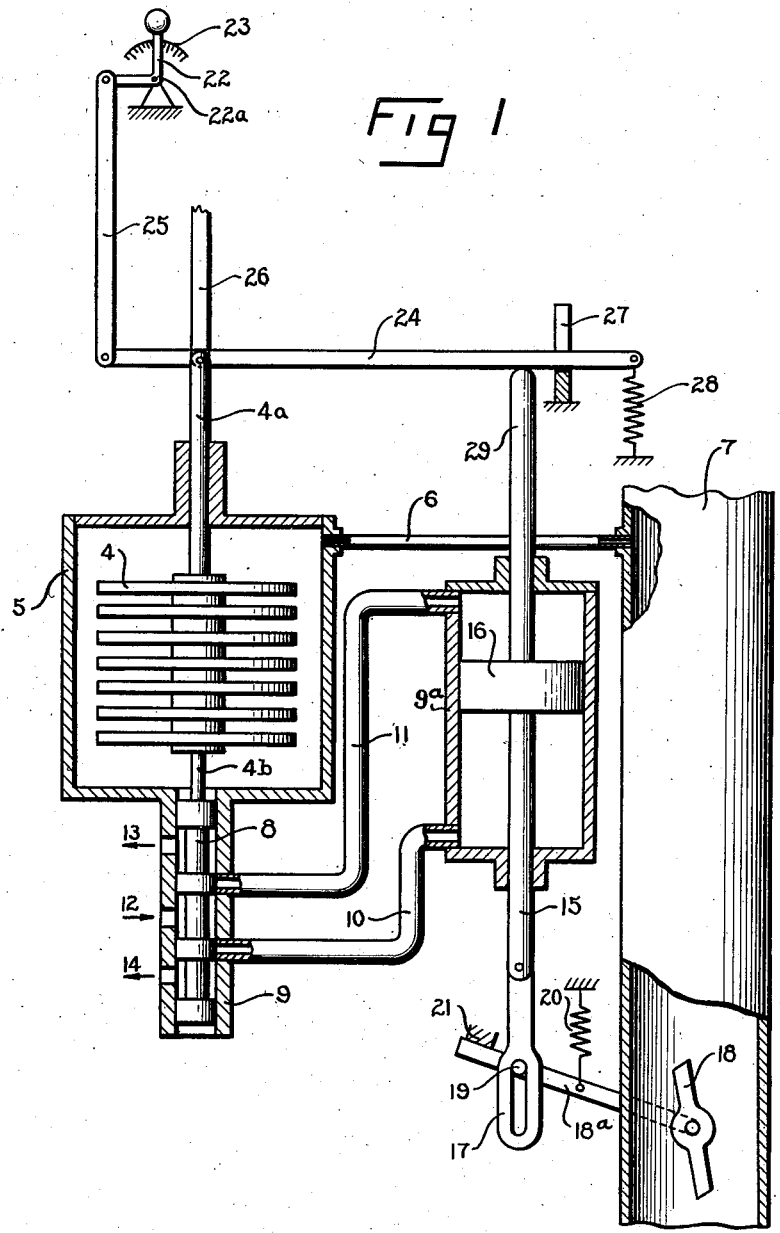

Feb. 6, 1940.   K. SAUR   2,189,475
REGULATING APPARATUS
Filed Oct. 12, 1937   2 Sheets-Sheet 1

INVENTOR.
Karl Saur
BY
Stephen Cerstvik
ATTORNEY.

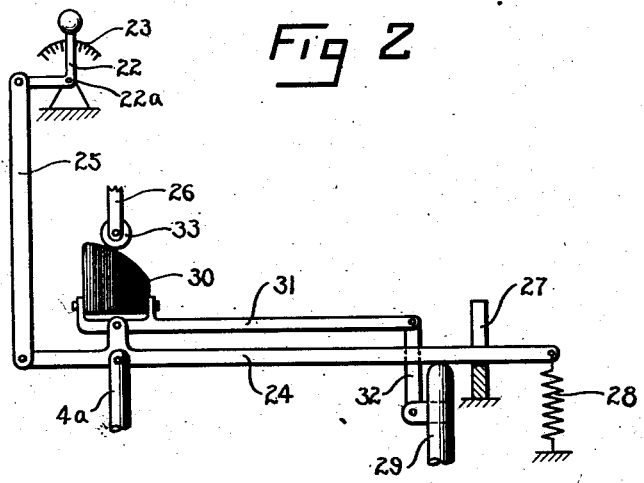
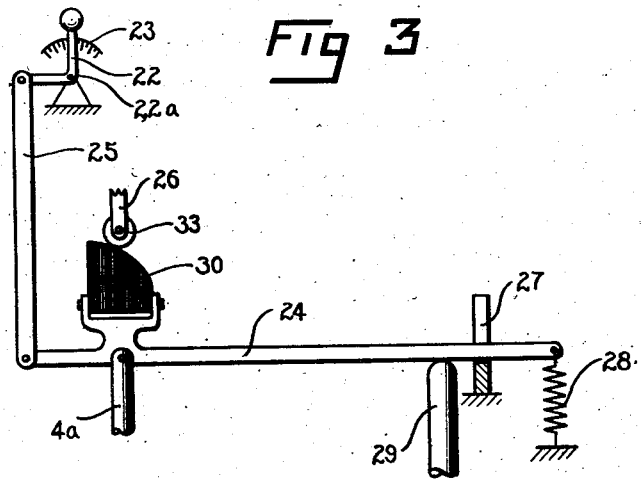

Patented Feb. 6, 1940

2,189,475

UNITED STATES PATENT OFFICE 2,189,475

REGULATING APPARATUS

Karl Saur, Berlin-Reinickendorf, Germany, assignor to Siemens Apparate und Maschinen Gesellschaft mit beschränkter Haftung, Berlin, Germany, a corporation of Germany Application October 12, 1937, Serial No. 168,670
In Germany September 5, 1936

9 Claims. (Cl. 123—103)

This invention relates to regulating apparatus and particularly to control apparatus for aircraft engines.

In the regulation of an operating condition, for example, the pressure in the intake manifold of an internal combustion engine, it is often desirable that a second operating condition be adjusted as a function of the first. As long as the first operating condition responds to the regulating apparatus, an adjusting member for the first operating condition can be utilized for regulating the second operating condition. However, operating conditions may exist wherein the first operating condition is no longer controlled by the regulating apparatus, in which case the second condition is improperly adjusted if it is responsive solely to the original adjusting member. Devices heretofore proposed to meet this condition have employed additional apparatus to measure the first operating condition and to act as an impulse transmitter for the second.

One of the objects of the present invention is to provide novel simplified regulating apparatus which requires a single measuring means.

Another object of this invention is to provide novel regulating apparatus which is adapted for regulating one or a plurality of operating conditions in accordance with changes in a single condition.

A further object is to provide novel means for controlling the intake pressure of an aircraft engine.

An additional object is to provide novel means for simultaneously regulating the intake pressure and the percentages of fuel and air in the fuel mixture for an engine.

A further object is to provide novel means for regulating one or a plurality of operating conditions wherein the adjusting member for the first condition acts as an impulse transmitter for adjusting a second.

The above and further objects and novel features of the invention will more fully appear from the following detailed description when the same is read in connection with the accompanying drawings. It is to be expressly understood, however, that the drawings are for the purpose of illustration only and are not intended to define the limits of the invention, reference being primarily had for this latter purpose to the appended claims.

In the drawings, wherein like reference characters refer to like parts throughout the several views, Fig. 1 is a side elevation with parts cut away showing one embodiment of the invention;

Fig. 2 is a side elevation of the differential linkage as shown in Fig. 1 but with a second embodiment of fuel pump adjusting means; and, Fig. 3 shows a third embodiment of the fuel pump adjusting means.

The form of the invention illustrated in the accompanying drawings, by way of example, is a device for regulating the amount of fuel (second operating condition) fed to an engine per revolution in proportion to the intake pressure (first operating condition) which is held constant at chosen adjustable values which are preferably adjusted manually. A pressure sensitive member which is responsive to changes both in the manual adjustment and in the intake pressure is adapted for controlling a servomotor which, in turn, governs suitable valve means for restoring the intake pressure to its original value and which beyond a certain pressure value controls means for adjusting the amount of fuel.

In the form illustrated in Fig. 1, the novel regulating means comprise a pressure responsive membrane 4 mounted within a housing 5 which is in communication by means of a passage 6 with a conduit 7 conducting fluid under pressure to be regulated. The membrane 4 controls a distributing valve 8 attached to shaft 4b within a valve housing 9. A servo-motor 9a is governed by this valve through passages 10 and 11 by means of a fluid pressure agent admitted to the valve housing 9 through inlet 12 and exhausted through ports 13 and 14. Means are provided to enable motor 9a to govern the intake pressure comprising a shaft 15, attached to piston 16 of said motor, which, by means of a drag link 17, controls a throttle valve 18 attached to an arm 18a. A pin 19 upon said arm slidably operates within the slot of the drag link 17 and is resiliently urged to the upper extremity thereof by a spring 20. A limit stop 21 is provided for arm 18a and so positioned to prevent further motion of said arm when the valve 18 is fully opened.

Novel means are provided for manually adjusting the regulating mechanism such that the manual adjusting member controls the first operating condition by the servo-motor mechanism and acts within a fixed operating range as a direct impulse transmitter for the second operating condition. The means comprise a handle 22 pivoted, for example, at 22a and adapted for adjustment upon a suitable scale 23. Handle 22 is operatively connected to a differential lever 24, in the embodiment shown by an arm 25, and said lever is pivotally connected to, and positions, a shaft 4a attached to the membrane 4 on the side opposite to that of valve 8. The membrane 4 as above set forth controls the intake pressure (first operating condition). Shaft 4a is also pivotally connected to an arm 26 for the adjustment of a fuel pump (not shown) which controls the fuel injection (second operating condition). The differential lever 24 is mounted at its opposite end in a forked supporting member 27 and yieldingly held therein by a spring 28. Consequently, both the intake pressure and the fuel pump operation are responsive to the manual adjustment of handle 23 within the limits of operation of throttle valve 18. However, beyond the operating range of valve 18, means must be provided for adjusting the fuel pump, not according to the adjustment of handle 23, because it no longer can control the intake pressure, but according to the actual changes in the now unregulated intake pressure.

Novel means are provided for regulating the fuel pump, beyond the manually regulated operating range of throttle valve 18, comprising a rod 29 attached to piston 16 and adapted to coact with differential lever 24 to control the pump adjusting arm 26 and pressure membrane 4 after throttle valve 18 has reached the full open position as shown in Fig. 1. The piston 16 is enabled to continue its motion beyond the operating range of said throttle valve by means of the slotted member 17 attached to the piston rod 15 in the manner above explained.

In operation, the desired regulation is manually obtained by handle 23 which causes the pressure membrane 4 to assume a definite position within the housing 5 and simultaneously adjusts the fuel pump by means of the adjusting arm 26. Both adjustments are effected according to the intake pressure to be maintained. If the intake pressure in conduit 4 changes a small amount from the manually adjusted value, the length of the membrane capsule 4 will change a proportional amount and the distributing valve 8 will be opened thus actuating servo-motor 9a which will displace throttle valve 18 until the intake pressure has been restored. The membrane 4 now will have regained its original length and the valve 8 will be closed. As long as the aircraft flies below a certain critical altitude, i. e., the altitude below which throttle regulation is effective to control the intake pressure, the right end of the differential lever 24 will be resiliently held upon the forked supporting member 27 by the spring 28. However, when the critical altitude is reached, the throttle valve 18 will be fully opened as shown in Fig. 1 and the adjustable range of the intake pressure will be passed and said pressure cannot be restored by means of the throttle device. Inasmuch as the servo-motor piston 16 is connected to said throttle device by a slotted coupling member 17, it can be further displaced and by means of piston rod 29 can move differential lever 24. Therefore, any further reduction of the intake pressure will, by means of the membrane 4, displace the distributing valve 8 and again actuate motor 9a and cause piston rod 29 to lift differential lever 24 which will have the double effect of returning valve 8 to an inoperative position and of adjusting the fuel pump by means of arm 26. Thus, within a definite operating range, the fuel pump remains at a constant adjustment because the intake pressure is held constant by the regulating mechanism; however, when conditions occur wherein it is impossible to hold said pressure constant, the fuel pump is automatically adjusted in accordance with the unregulated changes in the intake pressure.

In the above-described embodiment, the quantity of fuel delivered to the engine upon each revolution is based upon the adjusted intake pressure in such a manner that the percentage of air and fuel in the mixture is constant. In practice, it is desirable to alter the percentage, under certain operation conditions, in proportion, for example, to operating conditions, such as the intake pressure, the revolutions per minute of the engine, the altitude, or the temperature of the engine. This alteration of the composition of the fuel mixture may be necessary to avoid damaging the engine through high loading or bad cooling as a result, for example, of the rarefied atmosphere, and may be accomplished by providing measuring means controlled by one of the above-mentioned conditions which will apply an impulse for adjusting the fuel pump in addition to the impulse provided by the embodiment shown in Fig. 1.

Novel supplementary means are provided for regulating the quantity of fuel in accordance with the intake pressure and thereby also in accordance with the revolutions per minute of the engine and the altitude, comprising a cam 30, as shown in Fig. 2, articularly mounted upon the differential lever 24 by means of rods 31 and 32. Rod 31 is pivotally mounted upon lever 24 and rod 32 connected to the former is pivotally mounted upon piston rod 29. In order to facilitate the operation of the cam 30 a roller 33 is rotatably mounted upon the follower member 26 which by this mechanism adjusts the fuel quantity within and beyond the range of operation of the throttle valve 18. If an alteration of the composition of the fuel mixture is to occur only beyond the operating range of valve 18, i. e., only after the critical altitude has been exceeded, the rods 31 and 32 are dispensed with as shown in Fig. 3 and the adjusting impulse will be produced by rod 29 lifting differential lever 24 from the fork member 27.

In operation, the position of the piston 16 is a function of the engine speed, the altitude and the intake pressure. If the engine speed and intake pressure are held constant, the piston 16 will move as a direct function of the altitude, i. e., the greater the altitude, the higher the piston rises in the embodiment illustrated. As the aircraft climbs, said piston, by means of rods 29, 32, 31 actuates cam 30 to adjust the fuel mixture as a function of the altitude and also the contours of the cam. Consequently, within the operating range of valve 18, the fuel pump receives an initial manual adjustment from handle 22 and a continuous adjustment from the cam 30. Beyond the operating range of throttle valve 18, the rod 29 lifts the differential lever 24 in the manner before described and further regulates cam 30.

There is thus provided a novel regulating device which may be used as an engine regulator and which is adapted to control one or a plurality of operating conditions in accordance with changes in a single condition. The apparatus may be employed for regulating the intake pressure and the fuel injection for an engine, for example, an aircraft engine and utilizes regulating means wherein the adjusting member for the control of the first operating condition acts as an impulse transmitter for adjusting a second condition. Novel cam means are also provided for adjusting the second operating condition which simplifies the construction and manufacture of the apparatus. Novel means are also provided to regulate the second operating condition beyond the manually regulated operating range of said first condition, thus eliminating the necessity for added measuring and regulating apparatus.

Although a plurality of embodiments of the invention have been illustrated and described in detail, it is to be expressly understood that the same is not limited thereto. For example, in the form shown, the handle 22 is directly connected to lever 24 by arm 25; however, this may be any operative connection, such as an electrically actuated control means between said handle and lever. Also, an hydraulic servo-motor mechanism is illustrated; however, this also may be replaced by a suitable electric servo-motor or follow-up system. Various changes may also be made in the design and arrangement of parts illustrated without departing from the spirit and scope of the invention as the same will now be understood by those skilled in the art. For a definition of the limits of the invention, reference will be had to the appended claims.

What is claimed is:

1. In apparatus of the class described, an adjusting member, means controlled by said member for controlling a servo-motor, means for controlling an operating condition within an operating range by said servo-motor, a member for adjusting a second operating condition in accordance with the adjustment of said member, and means for controlling said second operating condition by said servo-motor beyond said operating range.

2. In apparatus of the class described, a membrane responsive to changes in an operating condition, means for adjusting said membrane, servo-motor means responsive to said membrane for controlling said operating condition within an operating range and a member of said servo-motor for controlling a second operating condition when said operating range has been exceeded.

3. In apparatus of the class described, a pressure responsive member, a servo-motor responsive to said member, a member adapted to control an operating condition within an operating range in accordance with said servo-motor, control means for positioning said pressure responsive member, an adjusting arm for a second operating condition, means for moving said arm in accordance with movement of said control means, and means for simultaneously controlling said pressure responsive member and said adjusting arm beyond said operating range of said first operating condition.

4. In apparatus of the class described, a differential lever adapted for manual adjustment within an operating range, a pressure responsive member and an adjusting arm operatively connected thereto, servo-motor means responsive to said pressure member, valve means controlled by said servo-motor within said operating range, and means for operatively connecting said servo-motor and said differential lever beyond said operating range.

5. In apparatus of the class described, a differential lever, means for manually adjusting said differential lever, supplementary means for controlling an operating condition comprising a cam operatively connected to said lever, a servo-motor system responsive to said lever for regulating an additional operating condition, and means for actuating said cam by said servo-motor.

6. In apparatus of the class described, a differential lever adapted for manual adjustment, a pressure responsive member operatively connected to said lever, a servo-motor system responsive to said pressure member, cam means connected to said differential lever, and means for controlling said cam by said servo-motor.

7. In a device of the character described, a suction pipe, valve means for regulating the flow through said pipe, a servo-motor, means responsive to the pressure in said pipe for controlling said servo-motor, means including a lost-motion device for connecting said servo-motor and said valve means, a lever, means for manually controlling said lever, connecting means between said lever and said pressure responsive means whereby said valve means may be manually controlled, means controlled by the position of said lever for regulating a fuel supply and means including said lost-motion device whereby said motor controls said lever after said valve means are in fully open position.

8. In a device of the character described, a suction pipe, valve means for controlling the flow through said pipe, a servo-motor, means responsive to the pressure in said pipe for controlling said servo-motor, means including a lost-motion device for connecting said servo-motor and said valve means, a lever, means for manually controlling said lever, connecting means between said lever and said pressure responsive means whereby said valve means may be manually controlled, means controlled by the position of said lever for regulating a fuel supply including a cam pivotally mounted on said lever, and means connecting said servo-motor, said lever and said valve including said lost-motion device whereby said fuel supply is regulated after said valve has reached an extreme of its position.

9. In a device of the character described, a suction pipe, valve means for controlling the flow through said pipe, a servo-motor, means responsive to the pressure in said pipe for controlling said servo-motor, a lever, means interconnecting said lever and said pressure responsive means, means connected to said lever for controlling a fuel supply including a cam, and means including a lost-motion device interconnecting said valve means, said servo-motor and said cam whereby said fuel supply is controlled after said valve means is completely open.

KARL SAUR.